(12) United States Patent
Bucknell

(10) Patent No.: US 8,715,580 B2
(45) Date of Patent: May 6, 2014

(54) THERMAL MANAGEMENT EXHAUST TREATMENT DEVICE AND METHOD OF MANUFACTURE

(75) Inventor: John R. Bucknell, Royal Oak, MI (US)

(73) Assignee: GM Global Technology Operations LLC, Detroit, MI (US)

(*) Notice: Subject to any disclaimer, the term of this patent is extended or adjusted under 35 U.S.C. 154(b) by 310 days.

(21) Appl. No.: 12/720,227

(22) Filed: Mar. 9, 2010

(65) Prior Publication Data

US 2011/0223067 A1 Sep. 15, 2011

(51) Int. Cl.
*B01D 50/00* (2006.01)

(52) U.S. Cl.
USPC .......................................... 422/180; 422/177

(58) Field of Classification Search
USPC ...................................... 422/177, 180; 60/274
See application file for complete search history.

(56) References Cited

U.S. PATENT DOCUMENTS

| | | | | |
|---|---|---|---|---|
| 5,294,411 A | * | 3/1994 | Breuer et al. | 422/174 |
| 6,569,393 B1 | * | 5/2003 | Hoke et al. | 423/219 |
| 6,681,619 B2 | * | 1/2004 | Alleving et al. | 73/114.68 |
| 7,051,522 B2 | * | 5/2006 | Yang et al. | 60/320 |
| 2003/0202919 A1 | | 10/2003 | Bruck et al. | |
| 2011/0192141 A1 | | 8/2011 | Schepers et al. | |

FOREIGN PATENT DOCUMENTS

| | | |
|---|---|---|
| DE | 10056279 A1 | 5/2002 |
| DE | 102008044711 A1 | 3/2010 |

OTHER PUBLICATIONS

T. Endo et al., Study on Maximizing Exergy in Automotive Engines, SAE Technical Paper Series; Honda R&D Co., Ltd., 2007 World Congress, Detroit, Michigan, Apr. 16-19, 2007.
German Office Action for Application No. 10 2011 012 583.3 dated Oct. 29, 2012; 5 pages.

\* cited by examiner

*Primary Examiner* — Tom Duong
(74) *Attorney, Agent, or Firm* — Cantor Colburn LLP

(57) ABSTRACT

An exhaust gas treatment device is disposed in an exhaust gas treatment system and comprises a rolled metal cylinder of corrugated metal sheet having longitudinally extending passages extending axially from an inlet end to an outlet end and a conduit disposed between layers of the rolled metal cylinder and configured for circulation of a heat transfer medium therethrough, the conduit extending axially and radially the rolled metal cylinder.

15 Claims, 4 Drawing Sheets

THERMAL MANAGEMENT EXHAUST TREATMENT DEVICE AND METHOD OF MANUFACTURE

FIELD OF THE INVENTION

Exemplary embodiments of the present invention relate to an apparatus for the treatment of exhaust gas from an internal combustion engine and, more particularly, to an exhaust treatment apparatus having active thermal management, and a method of manufacture thereof.

BACKGROUND

The exhaust gas emitted from an internal combustion engine is a heterogeneous mixture that contains gaseous emissions such as carbon monoxide ("CO"), unburned hydrocarbons ("HC") and oxides of nitrogen ("$NO_x$"). The exhaust gas may also contain condensed phase materials (liquids and solids) that constitute particulate matter. Catalyst compositions typically disposed on catalyst supports or substrates ("catalyst devices") are provided in the exhaust system of an internal combustion engine to convert certain, or all of these exhaust constituents into non-regulated exhaust gas components.

Catalyst devices may be constructed of a variety of materials including ceramic monolith structures and metal monolith structures which are coated with catalyst compositions that are selected to treat specific exhaust gas constituents. Most catalyst devices are configured to operate within a given exhaust gas temperature range. Operation below the temperature range may result in underperformance of the catalyst device and operation above the temperature range may result in an operational life (i.e. durability) that is less than desired. Various engine control strategies have been proposed for controlling the operating temperature ranges of catalytic devices. Such control strategies have involved the injection of fuel into the exhaust system (direct injection of fuel or late fuel injection in the internal combustion engine) to either raise or lower the temperature of the exhaust gas. While effective, control strategies which utilize fuel for purposes other than extracting work from the internal combustion engine tend to negatively affect the overall fuel efficiency of the engine. Other control strategies involve the use of electrically heated devices such as grids placed on or in the catalytic devices for heating the device to a desired temperature range. Electrically heated solutions, while effective to heat the catalytic devices, utilize significant electrical energy which must be generated by the internal combustion engine and are not useful for purposes of lowering the operating temperatures of the catalytic devices.

SUMMARY

In an exemplary embodiment an exhaust gas treatment device is disposed in an exhaust gas treatment system and comprises a rolled metal cylinder of corrugated metal sheet having longitudinally extending passages extending axially from an inlet end to an outlet end and a conduit disposed between layers of the rolled metal cylinder and configured for circulation of a heat transfer medium therethrough, the conduit extending axially and radially through the rolled metal cylinder.

In another exemplary embodiment a method of constructing an exhaust gas treatment device disposed in an exhaust gas treatment system comprising a rolled metal cylinder of corrugated metal sheet defining longitudinally extending passages extending axially from an inlet end to an outlet end and a conduit disposed between layers of the rolled metal cylinder and configured for circulation of a heat transfer medium therethrough, the conduit extending axially and radially therethrough, comprises placing the conduit, configured in a planar, serpentine configuration, on a single layer of the corrugated metal strip and rolling the metal strip and the conduit into the metal cylinder to form the substrate with the conduit captured between layers of the metal strip resulting in a conduit that is distributed both axially and radially throughout the substrate The above features and advantages, and other features and advantages of the invention are readily apparent from the following detailed description of the invention when taken in connection with the accompanying drawings.

BRIEF DESCRIPTION OF THE DRAWINGS

Other objects, features, advantages and details appear, by way of example only, in the following detailed description of the embodiments, the detailed description referring to the drawings in which.

DESCRIPTION OF THE EMBODIMENTS

Figure 1:
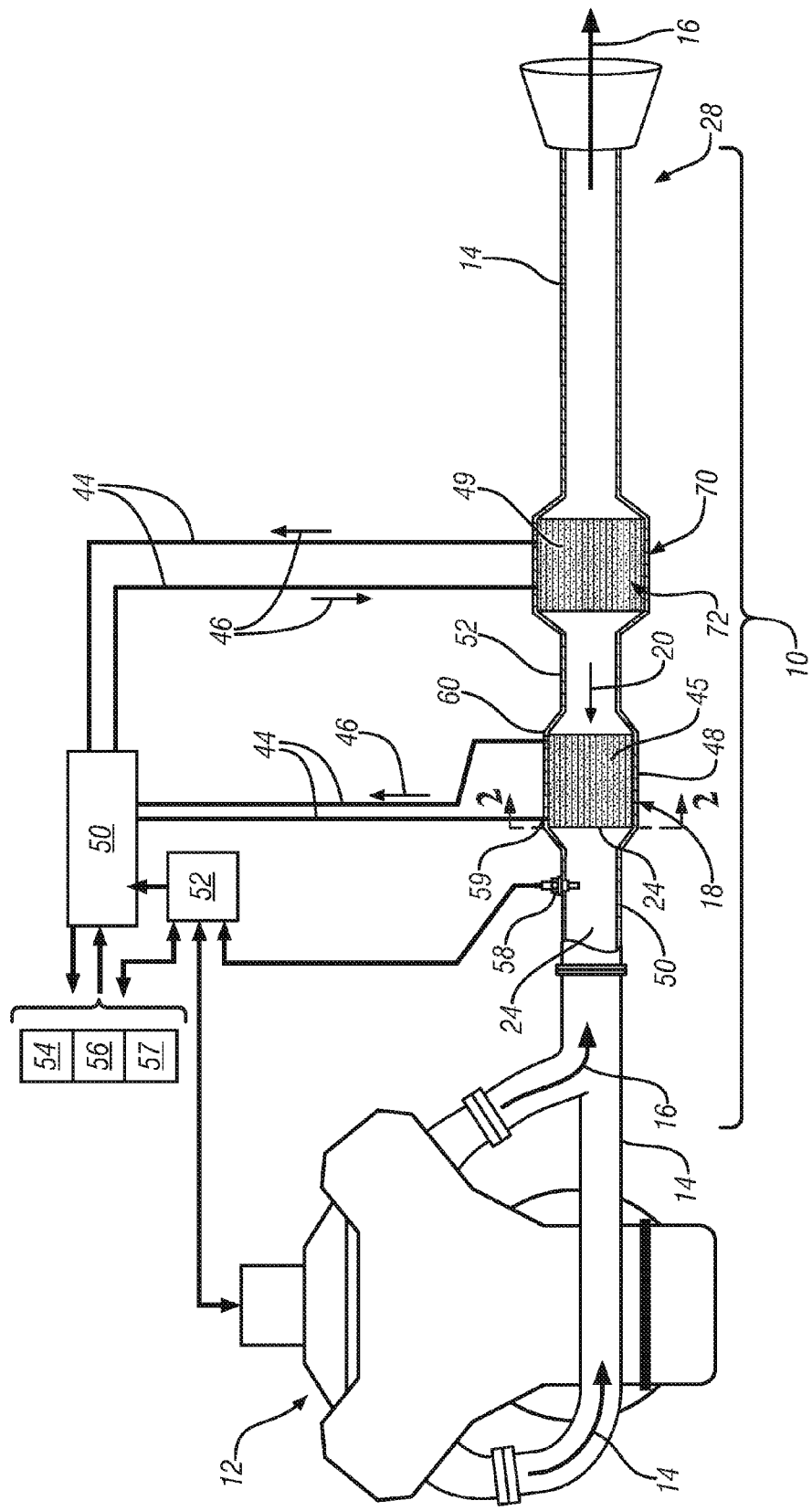
FIG. 1 is schematic view of an exhaust gas treatment system for an internal combustion engine bodying features of the invention.

The following description is merely exemplary in nature and is not intended to limit the present disclosure, application or uses. It should be understood that throughout the drawings, corresponding reference numerals indicate like or corresponding parts and features.

Figure 2:
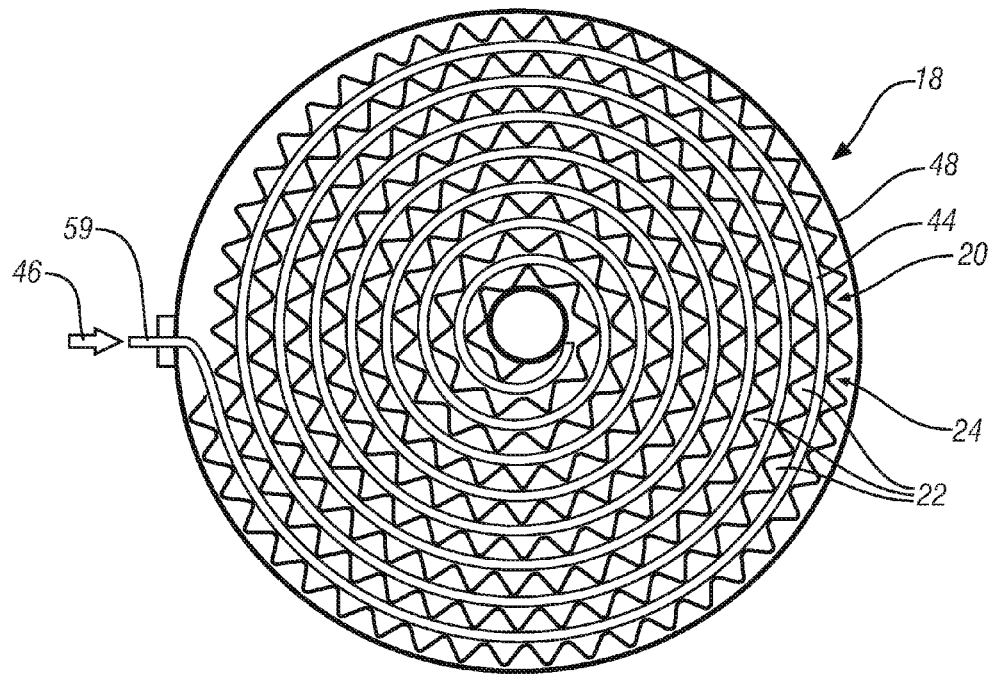
FIG. 2 is a sectional view of an exhaust treatment device of the exhaust treatment system taken along line 2-2 of FIG. 1, embodying features of the invention.

Referring now to FIG. 1, an exemplary embodiment of the invention is directed to an exhaust gas treatment system, referred to generally as 10, for the reduction of regulated exhaust gas constituents emitted by an internal combustion engine 12. The exhaust gas treatment system 10 includes an exhaust gas conduit 14, which may comprise several segments that function to transport exhaust gas 16 from the internal combustion engine 12 to one or more exhaust treatment components or catalyst devices such as Oxidation Catalyst ("OC") 18 of the exhaust gas treatment system 10. In an exemplary embodiment, FIGS. 2-4, OC 18 comprises a flow-through metal monolith or substrate 20 that is constructed of rolled strips of metal such as stainless steel, or other suitable, high-temperature metallic material that define a cylindrical structure having substantially longitudinally extending passages 22 extending from a first, inlet end 24 to a second, outlet end 26 and through which exhaust gas 16 may pass when the OC 18 is in fluid communication with the internal combustion engine 12 through exhaust gas treatment system 10.

Figure 3:
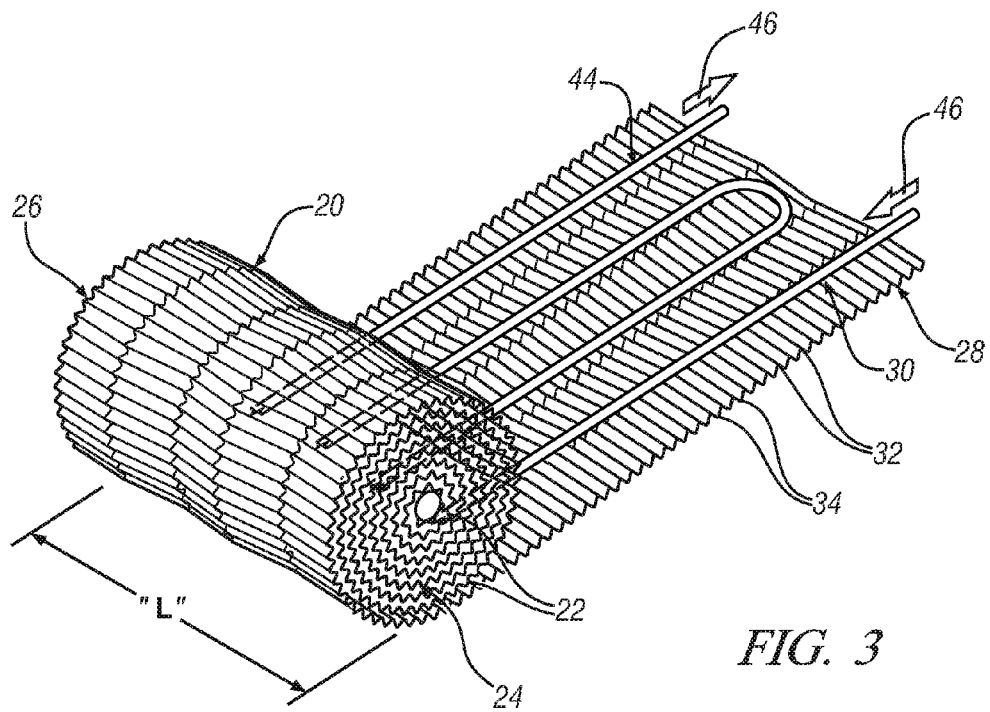
FIG. 3 is a perspective view of a method of manufacturing the exhaust treatment device of FIG. 2, embodying features of the invention.

In an exemplary embodiment shown in FIG. 3, the flow-through metal monolith or substrate 20 may comprise a single layer of metal strip 28 having a dimensional, angular or herringbone pattern 30 (corrugations) embossed or stamped therein. Upon rolling of the metal strip 28 to construct the cylindrical substrate, the peaks 32 and valleys 34 of the angular or herringbone pattern will tend to oppose one another to define the longitudinally extending passages 22 along the axial length "L" of the metal monolith 20.

Figure 4:
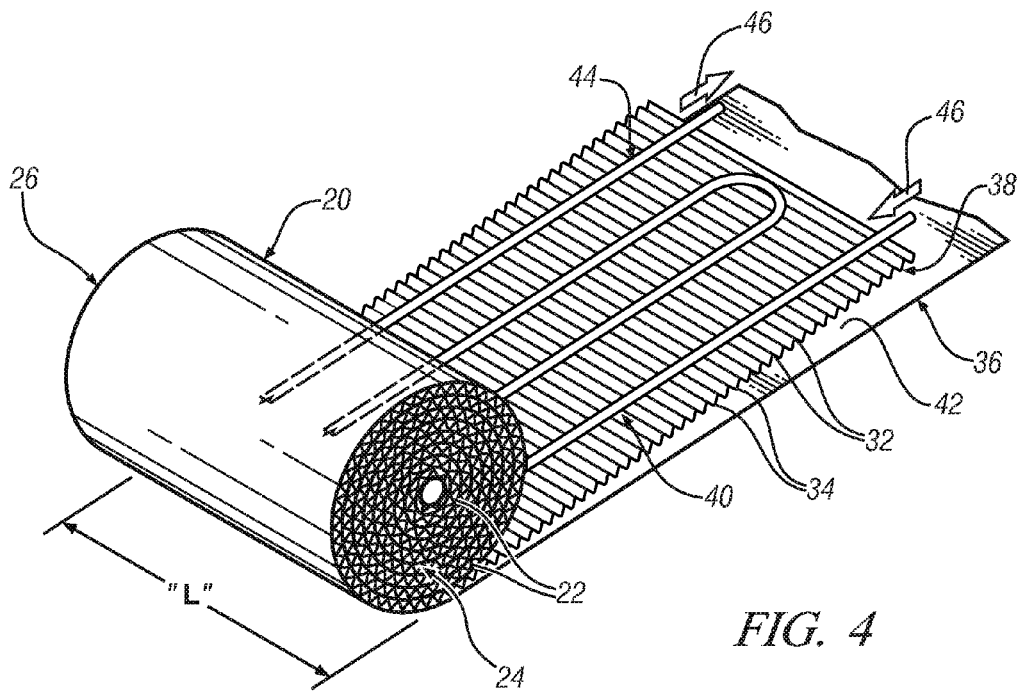
FIG. 4 is a perspective view of another embodiment of a method of manufacturing the exhaust treatment device of FIG. 2.

In an other exemplary embodiment, shown in FIG. 4, the flow-through metal monolith or substrate 20 may comprise a plurality of layers (in this example, two) of metal strip 36 and 38. A first metal strip 36 is essentially flat and void of dimensional features while a second metal strip 38 includes a dimensional, axial, angular or herringbone pattern 40 (corrugations) embossed or stamped therein. Upon rolling of the metal strips 36 and 38 to construct the cylindrical substrate, the peaks 32 of the dimensional, axial, angular or herringbone pattern 40 of metal strip 38 will rest against, or contact the flat surface 42 of the metal strip 36 to define the longitudinally extending passages 22 along the axial length "L" of the metal monolith 20.

The monolith 20 may include an oxidation catalyst compound 45 disposed thereon. The oxidation catalyst may be applied as a wash coat and may contain precious group metals such as platinum (Pt), palladium (Pd), rhodium (Rh) or other suitable oxidizing catalysts, or combination thereof. The OC 18 is useful in treating unburned gaseous and non-volatile HC and CO, which are oxidized to form carbon dioxide and water. Other catalyst devices such as a Selective Catalytic Reduction device 70 ("SCR") may also include a flow-through metal monolith 72 without departing from the scope of the invention. In the case of an SCR device, an SCR catalyst composition 49 preferably contains a zeolite and one or more base metal components such as iron ("Fe"), cobalt ("Co"), copper ("Cu") or vanadium which can operate efficiently to convert $NO_x$ constituents in the exhaust gas 16.

Referring particularly to FIGS. 1-4, a thermal management apparatus may comprise a conduit 44 comprising a tube that is configured to receive and conduct a heat transfer medium 46 therethrough. The conduit 44 is, in an exemplary embodiment, configured in a planar, serpentine configuration which is placed on the single layer of corrugated metal strip 28, FIG. 3, or on the plurality of metal strips 36, 38, FIG. 4, prior to rolling of the metal strips 28 or 36, 38 into the substrate forming the flow through metal monolith 20. Upon rolling of the metal strips 28 or 36, 38 to form the flow through metal monolith 20, the conduit 44 is captured between layers of the various strips resulting in a conduit that is distributed both axially and radially, FIG. 2, throughout the substrate of the flow through metal monolith 20.

Referring again to FIG. 1, during operation of the internal combustion engine 12 exhaust gases 16 exiting the engine flow through the exhaust gas treatment system 10 and are conducted through the exhaust gas conduit 14 to, and through one or more catalyst treatment devices such as the OC 18 and, if installed, SCR 70. The flow through metal monolith 20 of the OC 18, that is coated with a catalyst compound, is housed within a rigid, heat resistant canister or housing 48 that includes an inlet 50 and an outlet 52. The housing, in an exemplary embodiment, is constructed of stainless steel or other suitable material that is durable in a high temperature, underbody (in the case of an automotive application) application. Heat transfer medium 46 is delivered to the conduit 44 of the OC 18 through medium inlet 59 and outlet 60, and is circulated therethrough by an energy management system 50 that, in an exemplary embodiment, is associated with the vehicle in which the internal combustion engine 12 is resident. The energy management system 50 may include a controller 52 that is in signal communication with other vehicle systems such as the vehicle transmission 54, the internal combustion engine 12, the HVAC system 56, the battery pack 57 or other systems requiring the addition or removal of heat or electrical energy during operation. In addition, the controller 52 of the energy management system 50 is in signal communication with the exhaust treatment system 10 through various sensors such as temperature sensor 58 that allow the operating temperature of the OC 18 to be monitored thereby. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

In an exemplary embodiment, as the controller 52 of the energy management system 50 receives information from the sensor 58, it determines whether the OC 18 is operating within its optimal temperature range for the conversion, oxidation and/or reduction of regulated constituents in the exhaust gas 16 flowing through the exhaust treatment system 10. In instances in which the OC 18 is operating below a temperature at which its conversion of regulated exhaust constituents is efficient, the heat management system 50 may direct high temperature (a temperature higher than that of the OC 18) heat transfer medium 46 through the conduit 44 and to, and through, the OC 18 in order to raise the operating temperature of the catalytic treatment device. Alternatively, when the catalytic treatment device (ex. OC 18) is operating at a temperature higher than that required for optimal conversion of regulated constituents of the exhaust gas 16, the energy management system 50 may direct a low temperature (a temperature lower than that of the OC 18) heat transfer medium through the conduit 44 in order to reduce the operating temperature of the catalytic treatment device. Reducing the operating temperature of the OC 18 will have the effect of extending the operational longevity of the device. Heat removed from the OC 18 (or other catalytic treatment device such as SCR 70) may be utilized by the energy management system 50 to heat other vehicle systems such as the vehicle transmission 54, the internal combustion engine 12, the HVAC system 56 or other system requiring the addition of heat during operation of the vehicle. In the alternative, heat delivered by the energy management system 50 to the OC 18, or other catalytic treatment device in the exhaust gas treatment system 10 may be removed from other vehicle systems such as the vehicle transmission 54, the internal combustion engine 12, the HVAC system 56 or other system requiring the removal of heat during operation of the vehicle.

Figure 6:
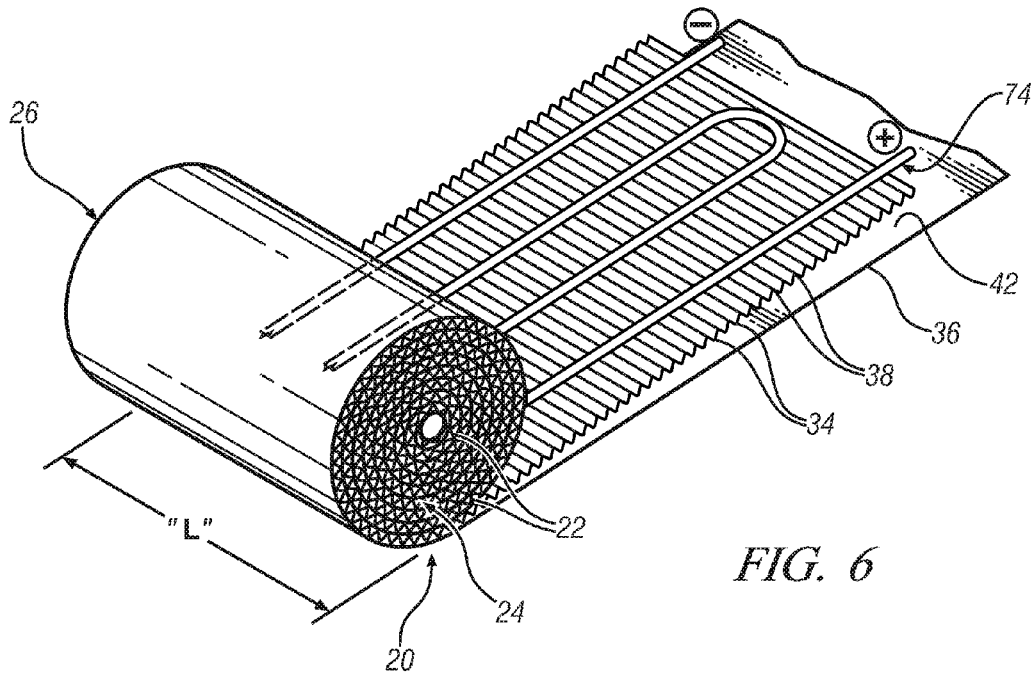
FIG. 6 is a perspective view of a method of manufacturing the exhaust treatment device of FIG. 5, embodying features of the invention.
Figure 5:
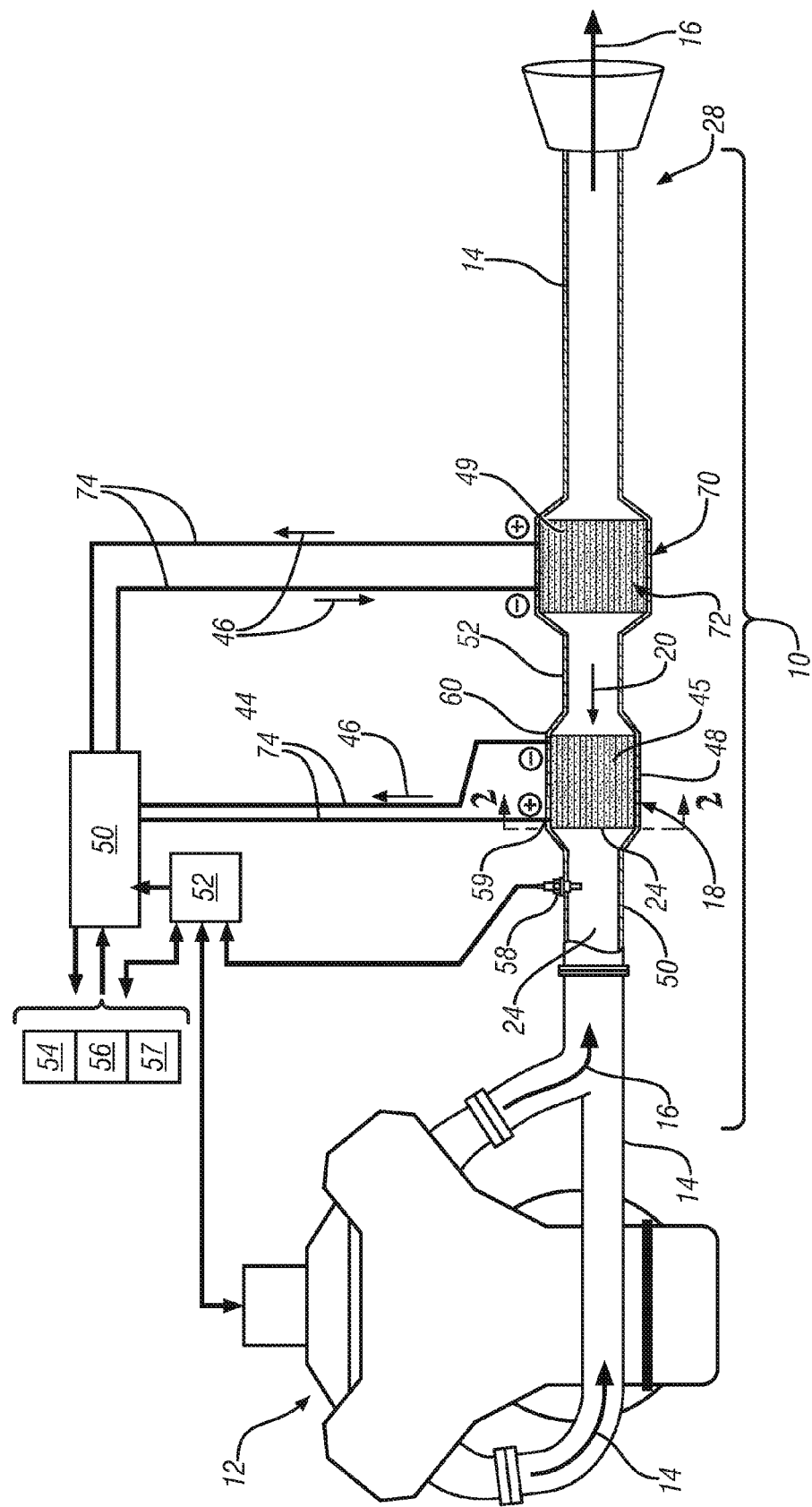
FIG. 5 is schematic view of another embodiment of an exhaust gas treatment system for an internal combustion engine bodying features of the invention.

In another embodiment illustrated in FIGS. 5 and 6, a thermoelectric device 74 may be substituted for, or included with, the conduit 44 in the construction of the flow through metal monolith 20 of the OC 18 or other catalytic device. The thermoelectric device 74 contacts hot exhaust gas 16 passing through the longitudinally extending passages 22 of the flow through metal monolith 20 and converts heat energy in the hot exhaust gas 16 to electrical energy. The electrical energy may be used by the energy management system 50 to power one or more electrical components (not shown) of the vehicle while having the effect of removing heat from the OC 18 (or other catalytic device) to thereby lower the operating temperature of the device for improved, long term durability as described above.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the present application.

What is claimed is:

1. An exhaust gas treatment system for an internal combustion engine, the system comprising:
    an exhaust conduit positioned downstream of, and configured to receive exhaust gas from, the internal combustion engine;
    a catalyst device disposed in the exhaust conduit, the catalyst device comprising a rolled metal cylinder of corrugated metal sheet having longitudinally extending passages extending axially from an inlet end to an outlet end;
    a single, continuous conduit disposed between layers of the rolled metal sheet and configured for circulation of a heat transfer medium through said rolled metal cylinder, the conduit extending axially and radially therethrough; and
    an energy management system operably coupled to the conduit, the energy management system having a controller programmed to:
        (a) deliver, through the conduit, heat transfer medium having a temperature higher than an operating temperature of the catalyst device, when the catalyst device is operating below a regulated exhaust constituent conversion temperature; and
        (b) deliver, through the conduit, heat transfer medium having a temperature lower than the operating temperature of the catalyst device, when the catalyst device is operating above an efficient regulated exhaust constituent conversion temperature.

2. The exhaust gas treatment system of claim 1, further comprising:
    a temperature sensor in, or proximate to, the exhaust treatment device, the temperature sensor in signal communication with the controller to provide a signal indicative of the operating temperature of the catalyst device.

3. The exhaust gas treatment system of claim 1, further comprising a thermoelectric device included with the conduit in the rolled metal cylinder and configured to contact exhaust gas passing through the longitudinally extending passages to convert heat energy in the exhaust gas to electrical energy.

4. The exhaust gas treatment system of claim 3, wherein the energy management system is configured to direct electricity to and from at least one vehicle system.

5. The exhaust gas treatment system of claim 4, wherein the at least one vehicle system includes a vehicle transmission, an internal combustion engine, an HVAC system, a battery pack, or combination thereof.

6. The exhaust gas treatment system of claim 1, wherein the catalyst device includes an oxidation catalyst disposed in the longitudinally extending passages containing precious group metals including platinum (Pt), palladium (Pd), rhodium (Rh), or a combination thereof.

7. The exhaust gas treatment system of claim 1, wherein the catalyst device further includes an SCR catalyst composition disposed in the longitudinally extending passages containing a zeolite and one or more base metal components such as iron ("Fe"), cobalt ("Co"), copper ("Cu") or vanadium, or a combination thereof.

8. The exhaust gas treatment system of claim 1, wherein the corrugated metal sheet comprises a single layer of metal strip having a dimensional, angular or herringbone pattern embossed or stamped therein.

9. The exhaust gas treatment system of claim 1, wherein the rolled metal cylinder is housed within a rigid, heat resistant canister or housing that includes an inlet and an outlet in fluid communication with the exhaust gas flowing through the exhaust gas treatment system.

10. The exhaust gas treatment system of claim 1, wherein conduit is thermally coupled to a vehicle system, and the energy management system controller is programmed to heat the vehicle system by directing heated heat transfer medium from the catalyst device to the vehicle system.

11. The exhaust gas treatment system of claim 10, wherein the vehicle system includes at least one of a vehicle transmission, an HVAC system, and a battery pack.

12. An exhaust gas treatment device disposed in an exhaust gas treatment system comprising:
    a rolled metal cylinder of corrugated metal sheet having longitudinally extending passages extending axially from an inlet end to an outlet end;
    a conduit disposed between layers of the rolled metal sheet and configured for circulation of a heat transfer medium through said rolled metal cylinder, the conduit extending axially and radially therethrough;
    a thermoelectric device included with the conduit in the rolled metal cylinder and configured to contact exhaust gas passing through the longitudinally extending passages to convert heat energy in the exhaust gas to electrical energy; and
    an energy management system configured to direct electricity to and from at least one vehicle system including a vehicle transmission, an internal combustion engine, an HVAC system, a battery pack or a combination thereof.

13. An exhaust gas treatment system for an internal combustion engine, the system comprising:
    an exhaust gas conduit positioned downstream of, and configured to receive exhaust gas from, the internal combustion engine;
    an oxidation catalyst (OC) device disposed in the exhaust conduit, the OC device comprising a rolled metal cylinder of a flat metal sheet and a corrugated metal sheet having longitudinally extending passages extending axially from an inlet end to an outlet end;
    a single, continuous first conduit disposed between the OC flat metal sheet and the OC corrugated metal sheet and configured for circulation of a first heat transfer medium through the OC device, the first conduit extending axially and radially therethrough;
    a selective catalytic reduction (SCR) device disposed in the exhaust conduit downstream of the OC device, the SCR device comprising a rolled metal cylinder of a flat metal sheet and a corrugated metal sheet having longitudinally extending passages extending axially from an inlet end to an outlet end; and
    a single, continuous second conduit disposed between the SCR flat metal sheet and the SCR corrugated metal sheet and configured for circulation of a second heat transfer medium through the SCR device, the second conduit extending axially and radially therethrough.

14. The exhaust gas treatment system of claim 13, further comprising an energy management system operably coupled to the first conduit and the second conduit, the energy management system having a controller programmed to:

(a) deliver, through the first conduit, first heat transfer medium having a temperature higher than an operating temperature of the OC device, when the OC device is operating below an OC regulated exhaust constituent conversion temperature;

(b) deliver, through the second conduit, second heat transfer medium having a temperature higher than an operating temperature of the SCR device, when the SCR device is operating below an SCR regulated exhaust constituent conversion temperature;

(c) deliver, through the first conduit, first heat transfer medium having a temperature lower than the operating temperature of the OC device, when the OC device is operating above an OC efficient regulated exhaust constituent conversion temperature; and (d) deliver, through the second conduit, second heat transfer medium having a temperature lower than the operating temperature of the SCR device, when the SCR device is operating above an SCR efficient regulated exhaust constituent conversion temperature.

15. The exhaust treatment system of claim 13, further comprising:

a vehicle transmission thermally coupled to at least one of the first and second conduits, wherein heat energy is transferred between the vehicle transmission and the OC device and/or the SCR device via the first and/or second heat transfer fluids, respectively; and a vehicle HVAC system thermally coupled to at least one of the first and second conduits, wherein heat energy is transferred between the vehicle HVAC system and the OC device and/or the SCR device via the first and/or second heat transfer fluids, respectively.

* * * * *